UNITED STATES PATENT OFFICE.

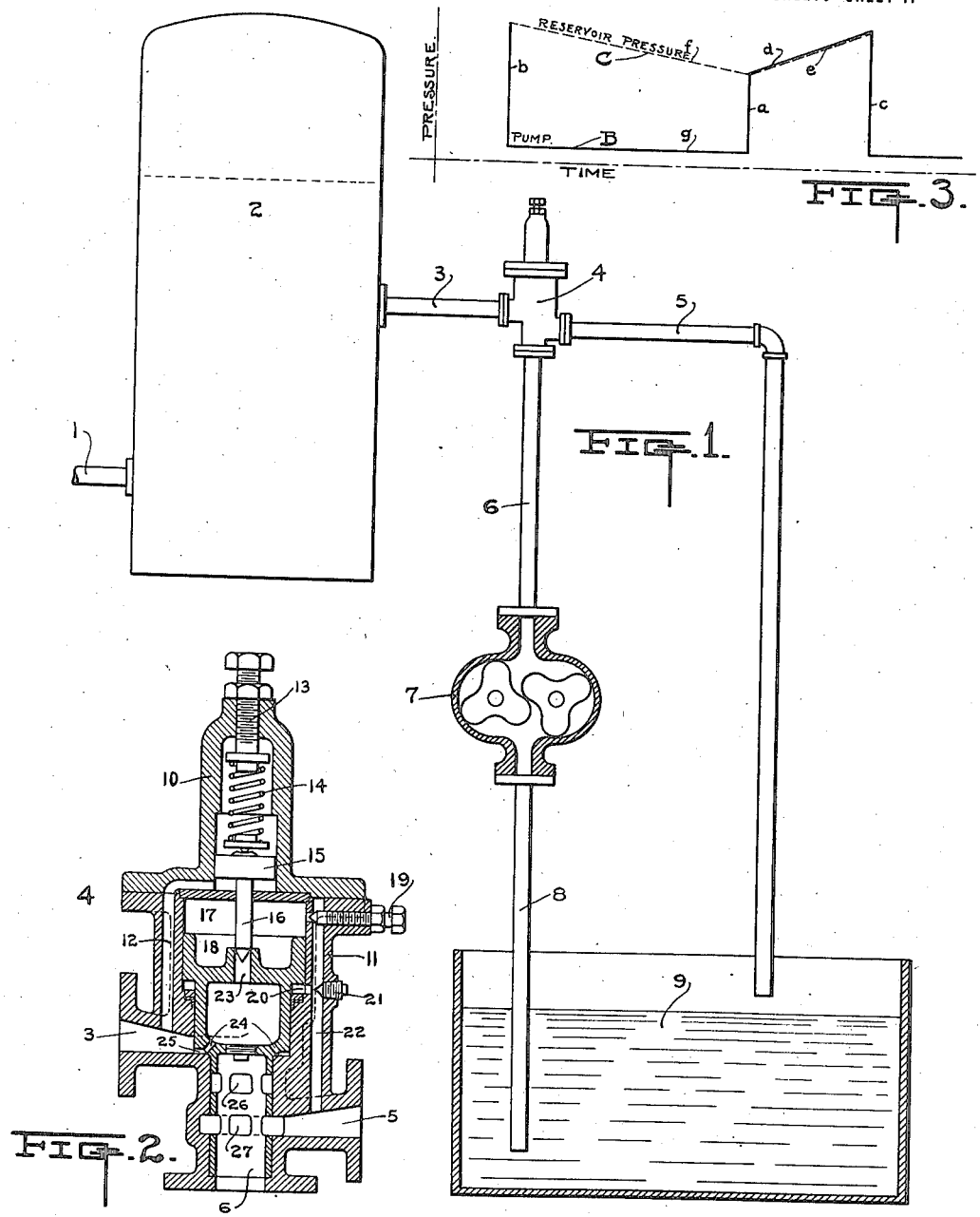

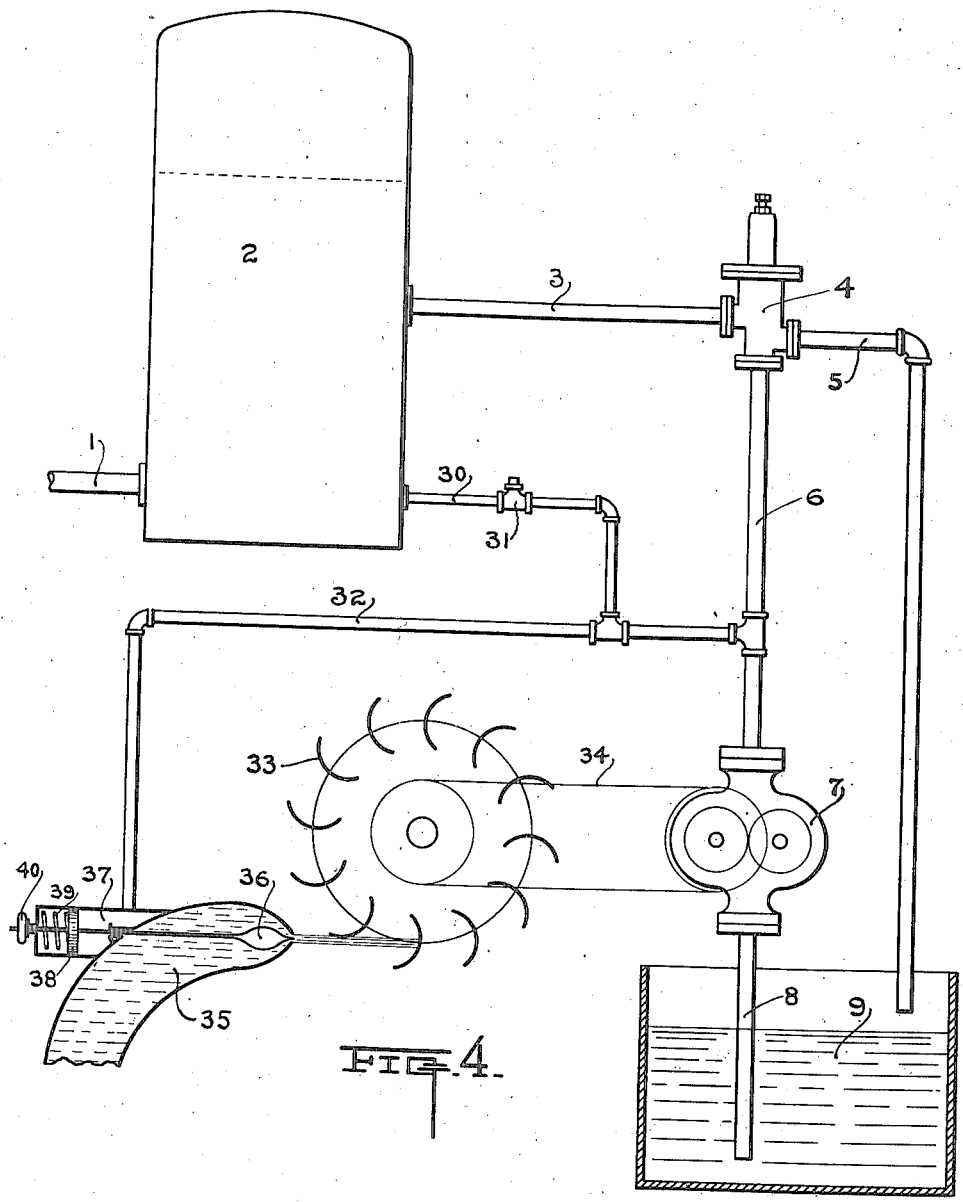

ARNOLD PFAU, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

FLUID-PRESSURE REGULATOR.

1,157,957.      Specification of Letters Patent.      Patented Oct. 26, 1915.

Application filed December 23, 1912. Serial No. 738,396.

*To all whom it may concern:*

Be it known that I, ARNOLD PFAU, a citizen of the Republic of Switzerland, residing at Milwaukee, in the county of Milwaukee and State of Wisconsin, have invented a certain new and useful Improvement in Fluid-Pressure Regulators, of which the following is a specification.

This invention relates to improvements in the construction of fluid pressure regulators adapted to control the pressure in storage reservoirs by maintaining the same between predetermined definite limits.

The invention, as herein disclosed, is applicable generally to pumping systems which supply fluid, such as oil, under pressure to oil governors or similar devices.

An object of the invention is to provide a fluid pressure regulator which is simple in construction and efficient in operation.

Another object is to provide a regulator which will permit the supply pump of a fluid pressure system to automatically maintain the desired working pressure in the system and which will automatically unload the supply pump after a predetermined working pressure has been established in the system.

Still another object is to provide means whereby the power furnished to operate the supply pump is automatically varied and maintained substantially proportional to the pump load.

During operation of oil governors such as are ordinarily employed in the regulation of hydro-electric power units, the amount of oil under pressure normally required by the system is very small, being sufficient only to overcome the drop in pressure due to leakage. A direct pumping apparatus applied to such a system, must however have a total capacity sufficiently great to enable the pump to supply the governor system with the necessary amount of oil under pressure, demanded in case of short circuits on the electrical power line supplied by the unit. With the application of the present invention, a small pump and storage reservoir provided with an air cushion, are substituted for the large pump heretofore required when supplying fluid under pressure direct, the large pump in such cases having been capable of maintaining in the storage reservoir a pressure between predetermined limits. In order to avoid the necessity of continuously operating the pump against maximum pressure by pumping into a storage reservoir relieved by a safety valve, the system of the present invention is provided with automatic devices which permit discharge from the pump of fluid under atmospheric pressure and simultaneously reduce the power of the pump to a minimum at times when the storage reservoir pressure is above the predetermined low limit.

A clear conception of one embodiment of the invention may be had by reference to the drawings accompanying and forming part of this specification, in which like reference characters designate the same or similar parts in the various views.

Figure 1 is an elevation showing the general arrangement of a pumping system for oil or other fluid pressure governors, the pump and supply reservoir thereof being shown in section. Fig. 2 is an enlarged central vertical section through the fluid pressure regulator of the system. Fig. 3 is a diagram showing pressure changes in the storage reservoir and the corresponding discharge pressures of the supply pump. Fig. 4 is an elevation of the general arrangement of a pumping system for oil or other fluid, showing means for varying the pump actuating power.

The fluid pressure utilizing device, which in the present case will be designated as a governor, not shown, receives its supply of fluid under pressure directly from the storage reservoir 2 through the discharge pipe 1, see Figs. 1 and 4. The fluid supply means or pump 7 has its suction connected with the supply reservoir 9 by means of an inlet pipe 8. The pump discharge conduit or pipe 6 connects the discharge end of the pump 7 with the inlet of the fluid pressure regulator 4. The fluid pressure regulator 4 is provided with two controllable discharge conduits or pipes 3, 5. The pipe 3 connects directly with the storage reservoir 2, while the pipe 5 discharges directly into the supply reservoir 9.

A means for controlling the actuation of the supply pump 7 is disclosed in Fig. 4, and consists of a prime mover represented as an impulse wheel 33, the actuating medium of which is controllable by the pressure in the discharge pipe 6. The impulse wheel 33 is drivingly connected with the pump 7 by means of a belt 34 or other suitable means.

The nozzle 35 has its discharge controlled by an adjustable needle 36 which carries a piston 38. The piston 38 is reciprocable within the cylinder 37. The spring 39 tends to force the needle 36 forward to close the nozzle orifice, the extent of closing of the orifice, however, being adjustably controlled by the hand wheel 40. The pressure chamber of the cylinder 37 communicates with the pump discharge pipe 6 through a conduit or pipe 32. The pipe 30 connects the storage reservoir 2 with the pipe 32, communication between the reservoir 2 and pipe 32 being normally closed off by means of a valve 31.

The fluid pressure regulator 4, see Fig. 2, consists essentially of an outer casing 11, a casing cap 10, a main valve 18, and a second valve 16. The casing 11 is bored to fit the valve 18 along three cylindrical portions thereof. The cylindrical portion of the valve 18 having the largest diameter is formed at one end, while the cylindrical portion having the smallest diameter is formed at the opposite end of the valve 18. The intermediate portion of mean diameter is provided with a central chamber which connects with the annular passage 25 through the constantly open ports 24. The passage 25 is constantly in communication with the storage reservoir 2 through the conduit or pipe 3. The central chamber of the intermediate portion of the valve 18 communicates with the chamber 17 of the casing 11 through a controllable port 23. The portion of the valve 18 having smallest diameter is formed as a hollow cylinder, the cylindrical wall of which is penetrated by two sets of ports 26, 27. The open lower end of the hollow cylindrical portion of the valve 18 is constantly in communication with the pump discharge conduit or pipe 6. With the valve 18 in the position as disclosed in Fig. 2, the pipe 6 is in communication with the conduit or pipe 5 through the ports 27. With the valve 18 in its extreme upper position, the pipe 6 is brought in communication with the storage reservoir 2 through the pipe 3 and ports 26.

The conduit 22 formed in the casing 11, forms an exhaust passage from the chamber 17 and annular chamber 20 to the pipe 5. The adjustable needle valve 19 provides a means for controlling the extent of opening between the conduit 22 and the chamber 17. The adjustable needle valve 21 provides a means for controlling the extent of opening between the conduit 22 and the annular chamber 20.

The cap 10 is bored to receive the piston 15, one surface of which is constantly in communication with the storage reservoir 2 through the conduit 12 and pipe 3. The needle valve 16 carried by the piston 15 controls the port 23, thereby controlling the communication between the chamber 17 and the pressure chamber formed in the midportion of the valve 18. The spring 14, the compression of which may be regulated by means of the adjustable seat 13, tends to force the piston 15 and valve 16 toward the valve 18.

The operation of the device will be readily understood by referring to the diagram, Fig. 3, in which the ordinates represent pressures while the abscissae represent time. The variation in pressure within the storage reservoir is represented by the line —C—, while the variation in the discharge pressure of the pump 7 is represented by the line —B—. The drop in the discharge pressure of the pump 7, which is represented by the portion —b— of the line —B—, represents the reduction occasioned by the sudden shifting of the valve 18 of the fluid pressure regulator, from its extreme upper to its extreme lower position, with a resulting cutting off of communication between the pipes 3, 6, and establishing of communication between the pipe 6 and atmosphere through the ports 27 and pipe 5. The second valve 16 at the time represented by the lower end of the line portion —b— is in its extreme upper position, having been forced into this position in opposition to the pressure of the spring 14 by the maximum storage reservoir pressure acting upon the lower surface of the piston 15. The storage reservoir pressure the maximum of which is represented by the upper extremity of the portion —b—, gradually decreases as indicated by the portion —f— of the line —C— until the minimum pressure represented by the upper extremity of the portion —a— of the line —B— is reached. During the gradual reduction of storage reservoir pressure, the piston 15 and second valve 16 are gradually forced downwardly toward the valve 18 by the pressure of the spring 14, until the position of the second valve 16 as indicated in Fig. 2, is reached. The pump 7 during the time interval represented by the portion —g— of the line —B—, is discharging through the ports 27 and pipe 5 to the supply reservoir 9, the discharge pressure being substantially constant as indicated. At the instant the storage reservoir pressure has decreased sufficiently to permit the second valve 16 to close the port 23, the fluid under pressure within the chamber 17 escapes through the port controllable by the needle valve 19, to the exhaust pipe 5 through the conduit 22. This reduction of the pressure in the chamber 17 above the valve 18, permits the high pressure within the annular passage 25 which acts upwardly against the lower surface of the valve 18 exposed to the passage 25, to quickly force the valve 18 into its extreme upward position. The sudden upward movement of the valve 18 closes off the communication between the pipes 6, 5, through the ports 27, and establishes communication between the pipes 6, 3, through the ports 26, thus throwing full load upon the pump 7. The rise in the pump discharge pressure occasioned by the sudden shifting of the regulator valve 18, is represented by the portion —a— of the line —B— in the diagram. As the pump 7 continues to operate under full load, the pressure in the reservoir 2 gradually increases as indicated by the portion —e— of the line —C— until the maximum pressure has been reëstablished. The increase in the pump discharge pressure corresponds with that of the pressure in the reservoir 2, and is indicated by the portion —d— of the line —B—. The time required to reëstablish maximum reservoir pressure depends upon the capacity of the pump 7. At the upper end of the line —c— the apparatus and pressures are in the same condition as they were at the beginning of the cycle.

During the gradual increase of the storage reservoir pressure with full load on the pump, the piston 15 and valve 16 are gradually forced upwardly and away from the valve 18 by the fluid pressure acting against the piston 15, the spring 14 in the meantime being compressed. As the desired maximum pressure is reached, the valve 16 is withdrawn from the port 23 in the main valve 18, permitting a sudden rush of fluid under pressure from the chamber in the mid-portion of the valve 18 through the port 23 into the chamber 17. The annular chamber 20 is always in communication with the conduit 22 through a relatively large port and never receives any direct pressure supply from the storage reservoir 2, so that the admission of pressure to the chamber 17 causes sudden unbalanced pressure to act upon the valve 18 and quickly moves the main valve to its extreme lower position as shown. The extent of the unbalancing is equal to the maximum pressure acting on the difference in cross-sections between the upper and mid-portions of the valve 18.

At times when the discharge of the pump 7 is in communication with the exhaust pipe 5, the pressure in the pipes 6, 32, and the chamber 37 is comparatively low, see Figs. 3 and 4. The piston 38 and needle 36 are forced forward by the pressure of the spring 39. The size of the power jet may be regulated directly by means of the hand wheel 40 to furnish only sufficient power to overcome the friction of the wheel 33 and pump 7 and to keep the pump 7 primed. When the discharge pipe 6 is brought suddenly into communication with the pipe 3 by the pressure regulator 4, the pressure in the pipes 6, 32, and the piston chamber 37 rises suddenly and causes the piston 38 to withdraw the needle and to increase the power furnished to the pump 7 by the wheel 33 in direct proportion to the pressure increase. It will thus be noted that the power furnished to operate the pump 7 will be automatically maintained substantially proportional to the pressure in the discharge pipe 6. The valve 31 and passage or pipe 30 serve to start and prime the pump 7 by admitting fluid under pressure directly from the storage reservoir to the piston chamber 37. By adjusting the spring seat 13, the desired operating pressure in the storage reservoir 2 may readily be varied. The rapidity of the operation of the fluid pressure regulator may also be varied by adjusting the needle valve 19.

The terms upward and downward have been used in this description generally to designate directions as referred to the particular disclosure, but it should not be inferred therefrom that the device is operable only in the position in which the mechanism is disclosed. It should also be understood that it is not desired to be limited to the exact details of construction shown and described, for obvious modifications will occur to a person skilled in the art.

It is claimed and desired to secure by Letters Patent,—

1. In a fluid pressure regulator, means for supplying fluid under pressure, a storage reservoir, a conduit connecting the discharge of said supply means with said storage reservoir, a relief conduit connected to the discharge of said supply means, and a fluid pressure regulator for controlling the discharge of fluid from said supply means, said fluid pressure regulator comprising a main valve for controlling the passage of fluid through said relief conduit and having opposed pressure surfaces, means communicating with said storage reservoir for admitting fluid under pressure to the smaller of said opposed pressure surfaces, a second valve, a conduit controlled by said second valve for admitting pressure to the larger surface of said main valve, and means for positioning said second valve to control the pressure admitted to the larger pressure surface of said main valve.

2. In a fluid pressure regulator, means for supplying fluid under pressure, a storage reservoir, a conduit connecting the discharge of said supply means with said storage reservoir, a relief conduit connected to the discharge of said supply means, and a fluid pressure regulator for controlling the discharge of fluid from said supply means, said fluid pressure regulator comprising a main valve for controlling the passage of fluid through said relief conduit and having opposed pressure surfaces, means communicating with said storage reservoir for admitting fluid under pressure to the smaller of said opposed pressure surfaces, a second valve, a conduit controlled by said second valve for admitting pressure to the larger surface of said main valve, and adjustable means for positioning said second valve to control the pressure admitted to the larger pressure surface of said main valve.

3. In a fluid pressure regulator, means for supplying fluid under pressure, a storage reservoir, a conduit connecting the discharge of said supply means with said storage reservoir, a relief conduit connected to the discharge of said supply means, and a fluid pressure regulator for controlling the discharge of fluid from said supply means, said fluid pressure regulator comprising a main valve for controlling the passage of fluid through said relief conduit and having opposed pressure surfaces, means communicating with said storage reservoir for admitting fluid under pressure to the smaller of said opposed pressure surfaces, a second valve, a conduit controlled by said second valve for admitting pressure to the larger surface of said main valve, and means operable by the pressure in said storage reservoir for positioning said second valve to control the pressure admitted to the larger pressure surface of said main valve.

4. In a fluid pressure regulator, means for supplying fluid under pressure, a storage reservoir, a conduit connecting the discharge of said supply means with said storage reservoir, a relief conduit connected to the discharge of said supply means, and a fluid pressure regulator for controlling the discharge of fluid from said supply means, said fluid pressure regulator comprising a main valve for directly controlling the passage of fluid to said storage reservoir and through said relief conduit, said main valve having opposed pressure surfaces, means communicating with said storage reservoir for admitting fluid under pressure to the smaller of said opposed pressure surfaces, a second valve, a conduit controlled by said second valve for admitting pressure to the larger surface of said main valve, and means for positioning said second valve to control the pressure admitted to the larger pressure surface of said main valve.

5. In a fluid pressure regulator, means for supplying fluid under pressure, a storage reservoir, a conduit connecting the discharge of said supply means with said storage reservoir, a relief conduit connected to the discharge of said supply means, and a fluid pressure regulator for controlling the discharge of fluid from said supply means, said fluid pressure regulator comprising a main valve for controlling the passage of fluid through said relief conduit and having opposed pressure surfaces, means communicating with said storage reservoir for admitting fluid under pressure to the smaller of said opposed pressure surfaces, a second valve, a conduit controlled by said second valve for admitting pressure to the larger surface of said main valve, and pressure actuated means for opening said second valve to admit pressure to the larger surface of said main valve.

6. In a fluid pressure regulator, means for supplying fluid under pressure, a storage reservoir, a conduit connecting the discharge of said supply means with said storage reservoir, means operable by the pressure in said discharge conduit for controlling the actuation of said supply means, a relief conduit connected to the discharge of said supply means, and a fluid pressure regulator for controlling the discharge of fluid from said supply means, said fluid pressure regulator comprising a main valve for controlling the passage of fluid through said relief conduit and having opposed pressure surfaces, means communicating with said storage reservoir for admitting fluid under pressure to the smaller of said opposed pressure surfaces, a second valve, a conduit controlled by said second valve for admitting pressure to the larger surface of said main valve, and means for positioning said second valve to control the pressure admitted to the larger pressure surface of said main valve.

7. In a pressure regulator, means for supplying fluid under pressure, a storage reservoir, a conduit connecting the discharge of said supply means with said storage reservoir, means operable by an increase in the pressure in the discharge of said supply means to increase the actuating power of said supply means, a relief means, and a fluid pressure regulator interchangeably connecting said supply means to said storage reservoir or to said relief means.

In testimony whereof, the signature of the inventor is affixed hereto in the presence of two witnesses.

ARNOLD PFAU.

Witnesses:
G. F. De Wein,
W. H. Lieber.